United States Patent

[11] 3,628,693

[72] Inventor Jesse C. Moore
 Fort Recovery, Ohio
[21] Appl. No. 881,991
[22] Filed Dec. 4, 1969
[45] Patented Dec. 21, 1971
[73] Assignee Norman H. Kuhlman
 St. Marys, Ohio
 a part interest
 Original application Jan. 6, 1966, Ser. No. 519,179, now Patent No. 3,483,600. Divided and this application Dec. 4, 1969, Ser. No. 881,991

[54] STACKED PALLET SUPPORT AND DISPENSER APPARATUS
 4 Claims, 7 Drawing Figs.
[52] U.S. Cl...................................................... 221/223, 221/251, 221/298
[51] Int. Cl................................................................ B65h 3/22
[50] Field of Search.............................................. 221/176, 187, 196, 223, 230, 232, 251, 236, 293, 298

[56] References Cited
UNITED STATES PATENTS

| | | | |
|---|---|---|---|
| 1,590,926 | 6/1926 | Cooley | 221/223 X |
| 1,649,365 | 11/1927 | Poling | 221/298 X |
| 1,830,805 | 11/1931 | Myer | 221/298 X |
| 2,816,719 | 12/1957 | Richert | 221/298 X |
| 2,829,799 | 4/1958 | Johanson | 221/223 X |

Primary Examiner—Robert B. Reeves
Assistant Examiner—Thomas E. Kocovsky
Attorney—William R. Jacox ABSTRACT: Apparatus for retaining a stack of pallets or carrier members and for dispensing the lowermost pallet or carrier while retaining the other pallets in the stack thereof.

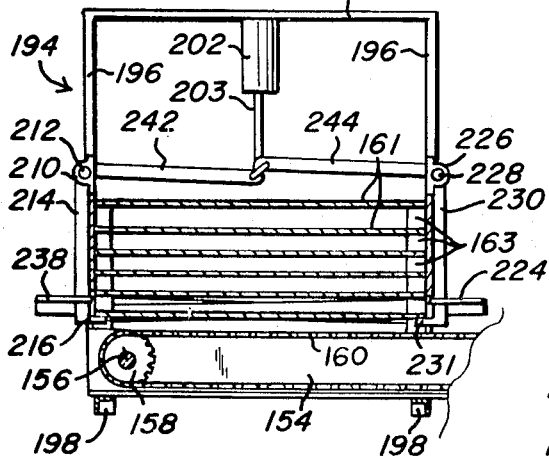
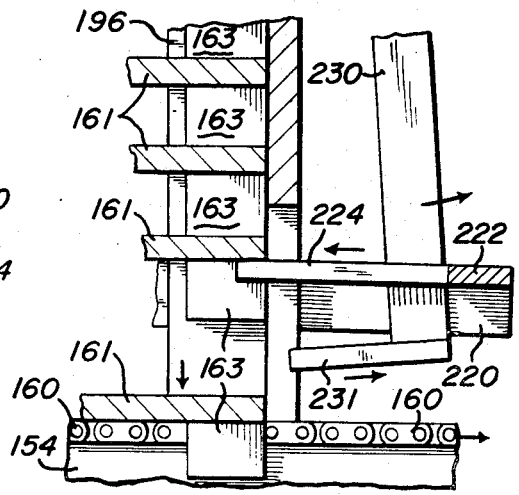
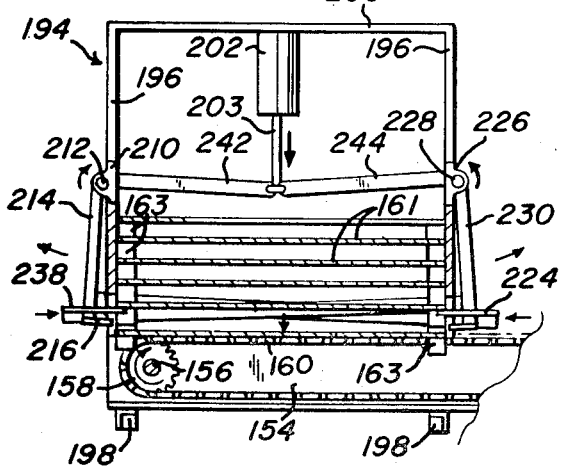
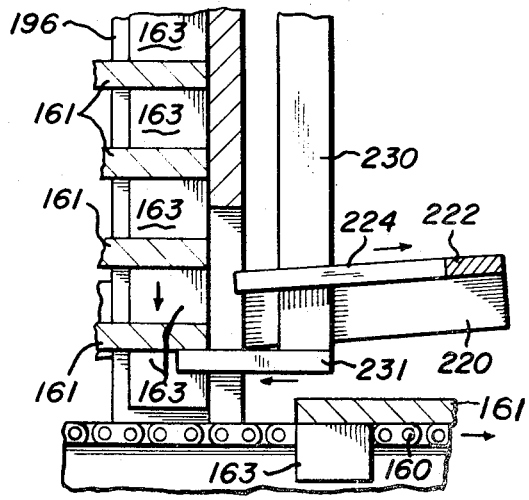
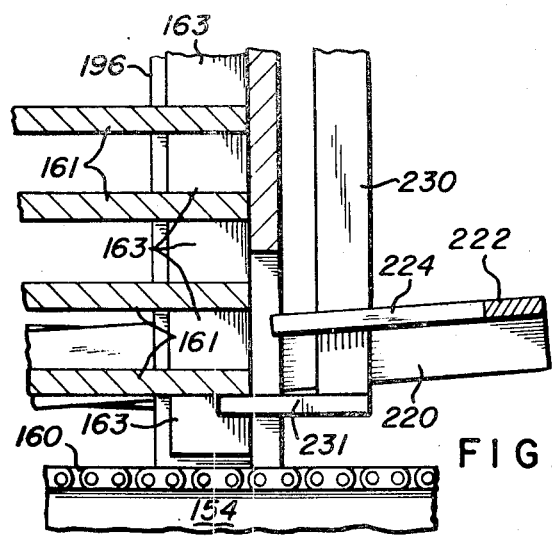
INVENTOR.
JESSE C. MOORE
BY William R Jacox
ATTORNEY

INVENTOR.
JESSE C. MOORE

BY William R Jacox

ATTORNEY 3,628,693

STACKED PALLET SUPPORT AND DISPENSER APPARATUS

RELATED APPLICATION

This application is a division of copending application Ser. No. 519,179, filed Jan. 6, 1966, for Apparatus For Forming Mold Material now U.S. Pat. No. 3,483,600.

BACKGROUND OF THE INVENTION

In numerous types of industry items are placed upon carrier members such as pallets or the like for movement of the items from one location to another location.

An object of this invention is to provide apparatus for retaining a stack of carrier members such as pallets or the like and for releasing the lowermost carrier or pallet from the stack thereof, while retaining the other carriers or pallets in the stack thereof.

BRIEF DESCRIPTION OF THE DRAWINGS

FIG. 1 is a side elevational view, with parts shown in section, showing pallet retainer and dispenser means of this invention. This figure also shows mechanism to which a carrier or pallet may be dispensed by apparatus of this invention.

FIG. 2 is a side elevational view similar to FIG. 1 but showing elements of the apparatus in another position of operation.

FIG. 3 is a greatly enlarged fragmentary sectional view showing a portion of the support and dispenser apparatus of this invention.

FIG. 4 is a fragmentary sectional view, similar to FIG. 3, but showing the elements thereof in another position of operation.

FIG. 5 is a fragmentary sectional view, similar to FIGS. 3 and 4, but showing the elements thereof in another position of operation.

FIG. 6 is taken from the reverse side of the apparatus from that shown in FIGS. 1-5.

FIG. 7 is taken from the reverse side of the apparatus from that shown in FIG. 6.

DESCRIPTION OF THE PREFERRED EMBODIMENT

Figure 6:
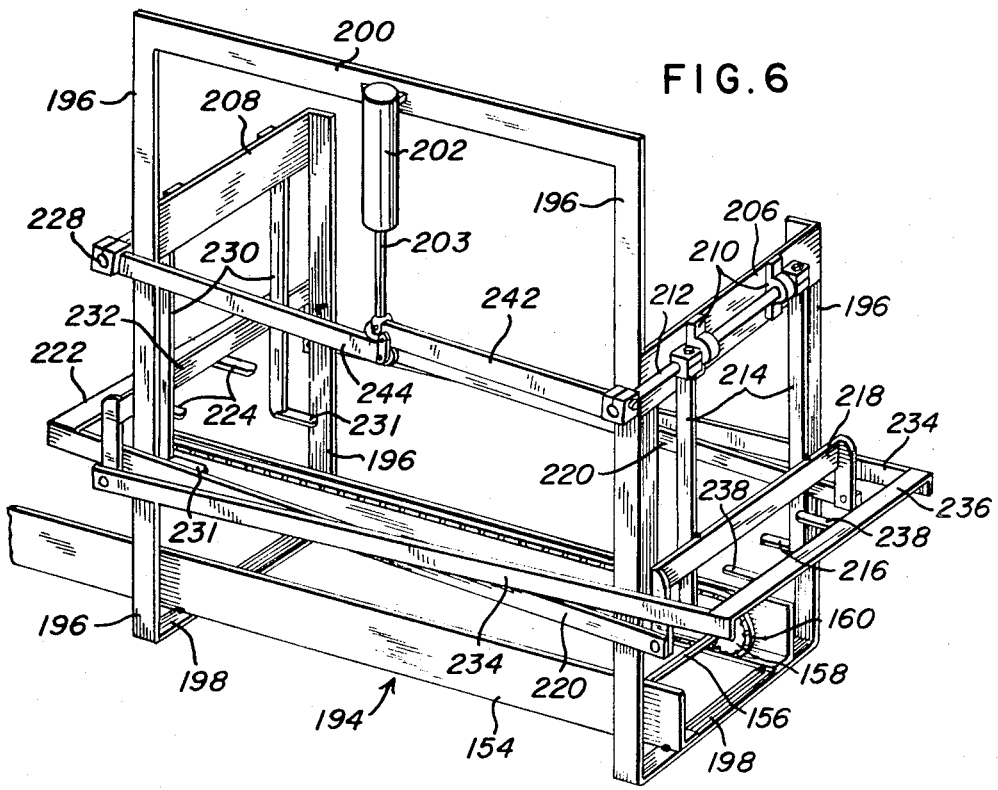
FIG. 6 is a perspective view, drawn on a slightly smaller scale than FIGS. 3, 4, and 5 of carrier support and dispenser apparatus of this invention.
Figure 7:
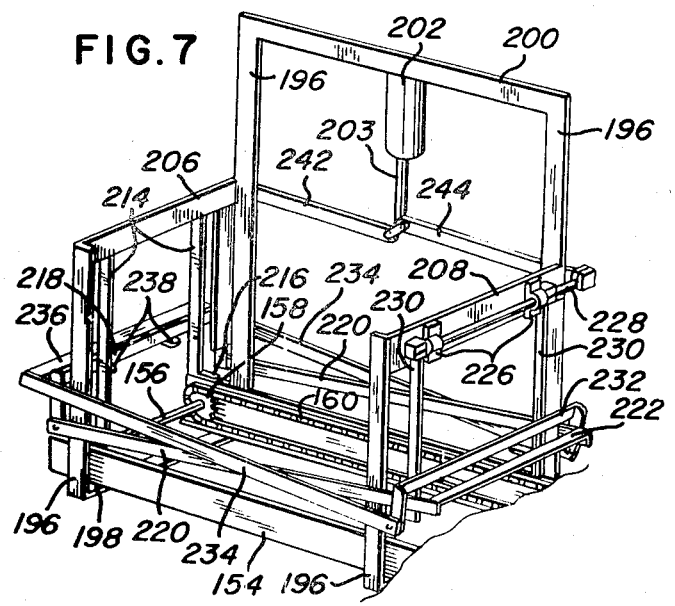
FIG. 7 is a perspective view, drawn on a slightly smaller scale than FIG. 6, showing the carrier support and dispenser apparatus of this invention.

FIG. 1 shows a stack of typical carrier members or pallets 161 which may be retained and discharged or dispensed by apparatus of this invention. Each pallet 161 is provided with feet 163. Pallet retainer and dispenser apparatus of this invention is referred to generally by reference numeral 194 and comprises a plurality of legs 196 which are attached to channels 154 and extend thereabove. A crossmember 198 disposed below the channels 154, joins a pair of the legs 196 together at each end of the pallet dispenser apparatus 194. Two of the legs 196 rise higher than the other legs 196 and have attached thereto at the upper ends thereof a support bar 200, as best illustrated in FIGS. 6 and 7. A fluid motor 202 is attached to the support bar 200 for support thereby. The fluid motor 202 has an actuator rod 203. A support bar 206 joins two of the legs 196 and a support bar 208 joins the other pair of the legs 196.

Attached to the support bar 206 are support bearings 210 which rotatably support a shaft 212, as shown in FIG. 6. Attached to the shaft 212 and extending downward therefrom are arms 214. The lower end of each arm 214 has a finger 216 which is substantially normal thereto, as shown in FIGS. 6 and 7. Attached to the arms 214 is a transverse link 218. The link 218 extends beyond the arms 214 and has connected thereto at each end thereof a link 220. The links 220 are outside the confines of the legs 196 and extend to positions beyond the opposite pair of legs 196. The links 220 have a link 222 attached thereto at the ends thereof opposite the arms 214. The link 222 has a plurality of fingers 224 attached thereto, as shown in FIG. 6. The links 218, 220, and 222 form a frame which encompasses the legs 196.

The support bar 208 has attached thereto support bearings 226 which rotatably carry a shaft 228, as shown in FIG. 7. A plurality of arms 230 are secured to the shaft 228 and extend downward therefrom. Each of the arms 230 has a finger 231 attached thereto at the lower end thereof, as shown in FIG. 6. The arms 230 have a link 232 secured thereto. A link 234 is secured to the link 232 at each end thereof. A link 236 is attached to the ends of the links 234 so that the links 232, 234, and 236 form a frame which encompasses the legs 196. A plurality of fingers 238 are attached to the link 236.

A lever 242 is attached to the shaft 212 for rotative movement thereof. The lever 242 is also pivotally attached to the actuator rod 203 of the fluid motor 202 for actuation thereby. A lever 244 is attached to the shaft 228 for rotation thereof. The lever 244 is also pivotally attached to the actuator rod 203 of the fluid motor 202 for actuation thereby.

The pallets 161 may drop from the apparatus to any suitable surface or support means. Herein, the channels 154 are shown rotatably supporting a shaft 156 which carries sprocket wheels 158. Each of the sprocket wheels 158 supports a conveyor chain 160, which is moved by any suitable means, not shown. A pallet dropped from the dispenser apparatus falls upon the conveyor chains 160 and is moved by the conveyor chains 160 in a direction away from the dispenser apparatus 194.

OPERATION

As shown in FIGS. 1 and 2, the pallet dispenser 194 carries a plurality of pallets 161, as the pallets 161 are stacked one upon the other with the feet 163 of each pallet 161 resting upon the surface of each pallet 161 directly therebelow. The lowermost pallet 161 in the stack thereof, which is carried by the pallet dispenser 194, is normally supported by the fingers 216 of the arms 214 and by the fingers 231 of the arms 230, as shown in FIGS. 1 and 3. The lowermost pallet 161 rests directly upon the fingers 216 and 231 while the fingers 216 and 231 are positioned between the feet 163 of the pallet 161. The fingers 238 and 224 of the links 236 and 222, respectively, are normally spaced slightly from the pallets 161, as shown in FIGS. 1 and 3.

When it is desired to dispense a pallet 161 from the carrier dispenser or pallet dispenser 194, the fluid motor 202 is energized so that the actuator rod 203 is moved downward. Thus, the levers 242 and 244, which are attached to the actuator rod 203, are rotatively moved downward and thus rotatively move the shafts 212 and 228, as illustrated in FIG. 2. Thus, the arms 214 and 230 and the fingers 216 and 231, respectively, thereof, are moved outwardly from the positions thereof shown in FIGS. 1 and 3 to the positions thereof shown in FIGS. 2 and 4. When such outward movement of the fingers 216 and 231 occurs, the fingers 216 and 231 are removed from engagement with the lowermost pallet 161, and the lowermost pallet 161 thus falls from the pallet dispenser 194 to the conveyor chains 160, as shown in FIGS. 2 and 4. The pallet 161 is thus moved by the conveyor chains 160 in a direction away from the dispenser apparatus 194, as illustrated in FIG. 5.

Due to the fact that the link 222 is attached to the arms 214 through the links 220 and 218, the link 222 moves toward the legs 196 as the arms 214 move away from the legs 196. Thus, the fingers 224 which are carried by the link 222 are moved toward the legs 196. Likewise, due to the fact that the link 236 is attached to the arms 230 through the links 234 and 232, the link 236 moves toward the legs 196 as the arms 230 move away from the legs 196. Thus, the fingers 238 which are attached to the link 236 move toward the legs 196.

When the fingers 224 and 238 and the links 222 and 236 move toward the pallets 161, the fingers 224 and 238 become positioned under the pallet 161 which is directly above the lowermost pallet 161 immediately before the fingers 216 and 231 are withdrawn from supporting engagement with the lowermost pallet 161. Thus, when the lowermost pallet 161 falls to the conveyor chains 160, the pallet 161 which is supported by the fingers 224 and 238 becomes the lowermost pallet 161, as shown in FIGS. 2 and 4.

Then the fluid motor 202 is again operated to move the actuator rod 203 upward. Thus, the arms 214 and 230 are moved toward the pallets 161 so that the fingers 216 and 231, respectively, thereof become positioned below the lowermost pallet 161, as shown in FIG. 5. As the fingers 216 and 231 become positioned below the lowermost pallet 161, the fingers 224 and 238 are withdrawn therefrom. Thus, the lowermost pallet 161 drops from the fingers 224 and 238 to the fingers 216 and 231, as illustrated in FIG. 5. Of course, when the lowermost pallet 161 drops within the pallet dispenser 194, all the pallets 161 in the stack thereof above the lowermost pallet 161 and which are supported thereby drop within the pallet dispenser 194. Of course, additional pallets 161 may be added to the stack at the top thereof in any suitable manner and as desired. When it is desired to dispense another pallet 161 from the pallet retainer and dispenser apparatus of this invention, the fluid motor 202 is again energized to move the actuator rod 203 downward to begin the cycle of operation described above.

The invention having thus been described, the following is claimed:

1. Pallet dispenser apparatus comprising:
support structure,
the support structure having a first part and a second part, the parts being spaced apart so that a stack of pallets may be positioned therebetween,
a plurality of support members, there being a first support member movably carried by the first part of the support structure, the first support member having a portion thereof adjacent the first part of the support structure and a portion thereof adjacent the second part of the support structure, the portions of the first support member being separated by both of the parts of the support structure so that when a portion of the first support member moves toward the first part of the support structure the other portion of the first support member moves away from the second part of the support structure and vice versa, there being a second support member movably carried by the second part of the support structure, the second support member having a portion thereof adjacent the second part of the support structure and a portion thereof adjacent the first part of the support structure, the portions of the second support member being separated by both parts of the support structure so that when a portion of the second support member moves toward the first part of the support structure the other portion of the second support member moves away from the second part of the support and vice versa, the portion of the first support member which is adjacent the second part of the support structure and the portion of the second support member which is adjacent the first part of the support structure being at a higher elevation than the other portions of the support member.
the lowermost pallet in the stack thereof being normally supported by the portion of the first support member which is adjacent the first part of the support structure and by the portion of the second support member which is adjacent the second part of the support structure, each pallet in the stack thereof above the lowermost pallet being supported by the pallet immediately therebelow,
means for simultaneously moving the portion of the first support member which is adjacent the first part of the support structure in a direction away from the first part of the support structure and for moving the portion of the second support member which is adjacent the second part of the support structure in a direction away from the second part of the support structure so that said portions of the support members are removed from supporting relationship with a lowermost pallet in a stack thereof, the portion of the first support member which is adjacent the second part of the support structure and the portion of the second support member which is adjacent the first part of the support structure thus moving one toward the other to support a pallet which is above the lowermost pallet as the lowermost pallet drops from the stack thereof.

2. Pallet dispenser apparatus according to claim 1 in which the support members comprise arms pivotally carried by the support structure, a frame attached to each arm and encompassing the support structure, the arms and the frames having fingers which extend toward the support structure.

3. Pallet retainer and dispenser apparatus comprising:
support structure,
first support means pivotally attached to the support structure,
second support means pivotally attached to the support structure and spaced from the first support means,
first finger means attached to the first support means adjacent a portion thereof which is spaced from the pivotal axis thereof,
second finger means attached to the second support means adjacent a portion thereof which is spaced from the pivotal axis thereof,
the first finger means and the second finger means extending generally one toward the other,
first extension means attached to the first support means and extending to a position adjacent the second support means,
second extension means attached to the second support means and extending to a position adjacent the first support means,
third finger means attached to the second extension means at a position adjacent the first support means, the third finger means extending toward the second support means,
fourth finger means attached to the first extension means at a position adjacent the second support means, the fourth finger means extending toward the first support means,
operator means attached to the first support means and to the second support means for simultaneous pivotal movement thereof,
the first finger means and the second finger means normally supporting the lowermost pile of a stack of pallets as the pallet is disposed between the first support means and the second support means,
the operator means being operable to move the first support means and the second support means one from the other, causing the pallet retained thereby to drop therefrom, movement of the first support means and the second support means one from the other causing movement of the extension means so that there is movement of the third finger means and fourth finger means one toward the other to support a pallet which was positioned immediately above the pallet which was dropped.

4. The apparatus of claim 3 in which the spacing between the third finger means and the second finger means is greater than the spacing between the second finger means and the first finger means and the first finger means, and in which the spacing between the fourth finger means and the first finger means is greater than the spacing between the first finger means and the second finger means.

* * * * *